March 5, 1963   J. K. BARRY   3,079,970
PRESS INSERT HAVING ANGULAR KNURLINGS
Filed Dec. 15, 1959   2 Sheets-Sheet 2
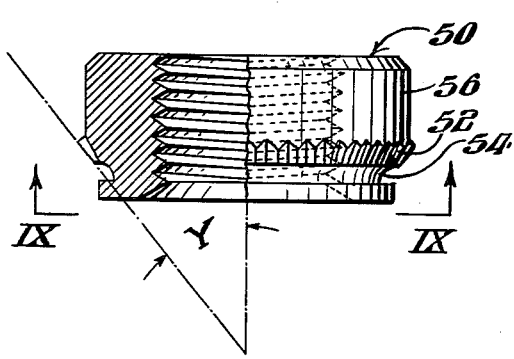
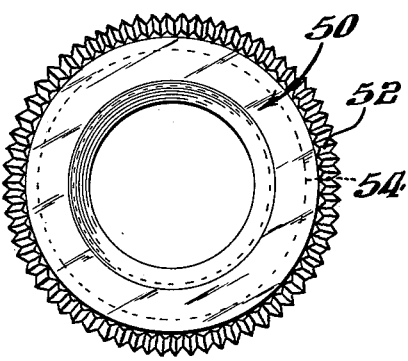
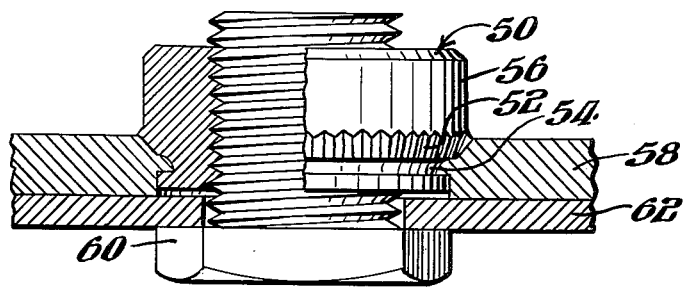
INVENTOR.
John K. Barry,
BY Paul & Paul
ATTORNEYS.

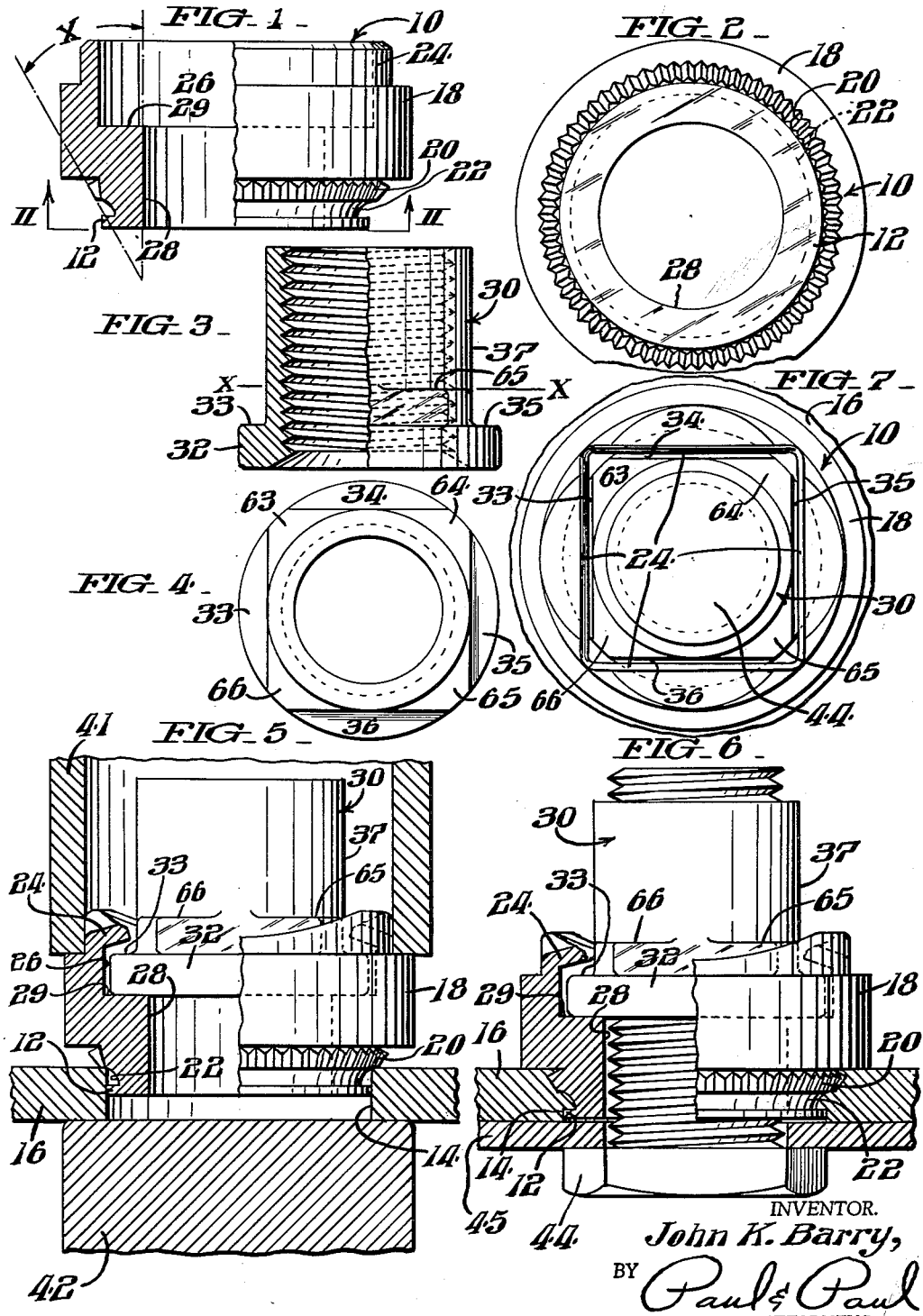

United States Patent Office

3,079,970
Patented Mar. 5, 1963

3,079,970
PRESS INSERT HAVING ANGULAR KNURLINGS
John K. Barry, Springfield, Pa., assignor to South Chester Corporation, Lester, Pa., a corporation of Delaware
Filed Dec. 15, 1959, Ser. No. 859,766
5 Claims. (Cl. 151—41.73)

This invention relates to sheet metal fasteners and in particular to a form of sheet metal fastener known as a press insert since it has no external threads and is secured by merely being inserted and pressed into a hole of proper size in a sheet of metal.

The press insert of the present invention has high resistance to radial displacement (torque-out) as well as high resistance to axial displacement (push-out).

In one form, a press insert embodying the present invention is a simple press nut. In another form, it is an assembly in two parts, one, an upper stud internally threaded and forming a floating nut, and two, a lower or base portion which is the insert pressed into the sheet of metal and which functions as a retainer for the floating nut. The base portion may therefore be termed a press insert retainer.

My invention will come clear from a consideration of the following description of several preferred embodiments taken together with the drawing in which:

FIG. 1 is a side elevation, partly in section, of a press insert retainer embodying my present invention;

FIG. 2 is a bottom view of the press insert retainer of FIG. 1 as viewed along the line indicated by II—II of FIG. 1;

FIG. 3 is a side elevation, partly in section, of the floating nut adapted to be inserted into the retainer of FIG. 1;

FIG. 4 is a top plan view of the floating nut of FIG. 3;

FIG. 5 is a side elevational view, partly in section, showing the press insert retainer and floating nut assembly about to be inserted into the sheet metal;

FIG. 6 is a side elevational view, partly in section, showing the press insert retainer and floating nut assembly after the assembly has been pressed into the sheet metal;

FIG. 7 is a top plan view of the assembly of FIG. 6;

FIG. 8 is a side elevation, partly in section, of a press nut embodying the present invention;

FIG. 9 is a bottom view of the press nut of FIG. 8 as viewed along the line indicated by IX—IX of FIG. 8; and FIG. 10 is a side elevational view, partly in section, showing the press nut of FIG. 8 after insertion in a sheet of metal.

In describing the preferred embodiments of my invention illustrated in the drawing, specific terminology has been resorted to for the sake of clarity. However, it is not the intention to be limited to the specific terms so selected, and it is to be understood that each specific term includes all technical equivalents which operate in a similar manner to accomplish a similar purpose.

Referring now to the drawing, shown in FIG. 1 is an item which is herein termed a "press insert retainer," meaning it is a press insert functioning as a retainer. The item it retains is shown in FIG. 3 and is termed herein a "floating press nut," meaning it is a nut held floating by a press insert retainer.

As is well known, a press insert is a metal fastener which becomes secured by merely being pressed into a hole in a sheet of metal having cold flow characteristics. The size of the hole relative to the size of the press insert is, of course, important to the operation of the device. For satisfactory operation, the hole should be sharply defined (unchamfered) at the top, should be of the same diameter as the flange of the insert, and should be smaller than the annular knurled part of the insert which, by exerting pressure on the edge of the hole, displaces metal of the sheet and causes it to flow into an annular recess or retaining groove provided in the insert. The displaced metal in the recess creates a ring of metal that anchors the insert securely in the sheet metal.

A common type of press insert is the press nut, which is an internally threaded press insert adapted to take a bolt. Hence, the insert functions as a nut and is so called. The item shown in FIG. 8 of the drawing of the present application is a press nut. As already stated above, the item shown in FIG. 1 is not a press nut; it is a press insert retainer. The combination of the press insert retainer of FIG. 1 and the floating nut of FIG. 3, assembled together, comprise a floating press nut.

My present invention is directed to an improved structure for a press insert which results in anchoring the insert more securely in the sheet metal. The improvement provided by my invention is applicable to both the press insert retainer of FIG. 1 and to the press nut of FIG. 8. Another feature of my invention is directed to the means for retaining a floating nut in a press insert.

Referring now to FIGS. 1 and 2, the press insert retainer 10 there shown is of annular configuration as is clearly seen in FIG. 2. The retainer has an annular flange 12 adapted to be inserted in a hole in a sheet of metal, the hole having the same diameter (substantially) as the outer diameter of the flange. This is illustrated in FIG. 5 where the flange 12 is shown part way into the hole 14 of the metal sheet 16, the hole 14 having been previously formed, as by punching, drilling, or otherwise. The metal sheet 16 may be any metal having cold-flow characteristics, such as steel, aluminum, or an alloy of copper.

The press nut retainer 10 has an enlarged upper portion or shank 18 the outside diameter of which is substantially larger than that of the flange 12. Just below shank 18 is a knurled annular portion 20 the outer diameter of which is smaller than that of shank 18 but larger than that of flange 12. Thus, the knurled ring 20 is of larger diameter than hole 14, as is seen in FIG. 5.

In accordance with my present invention, the knurling 20 is so generated, as by a knurling tool, that the knurling or serrations project at an angle X of from 30° to 60°, preferably 45°, with respect to the center axis of the annular press insert retainer 10. (In the prior art of which I am aware, the knurling is parallel to the center axis.)

Immediately below the knurling 20 is an annular recess or retaining groove 22 having, in accordance with my present invention, a flat floor and a curved inner wall rising smoothly in arch-like fashion toward the knurling, as is illustrated in FIGS. 1, 5 and 6.

I have found that by having the knurling 20 project at an angle in the range of from 30° to 60°, preferably 45°, and by giving the recess 22 the configuration shown in the drawing and described above, the displaced metal of the sheet will flow more readily into the recess and will result in a more secure anchoring of the press insert in the sheet metal with respect to both axial and radial displacement (push-out and torque-out).

Returning again to FIG. 1, the press insert retainer 10 is also provided with a collar 24 rising above shank 18 and of smaller outside diameter than the shank 18. The bore of the press insert retainer 10 is of two dimensions, an upper bore 26 of larger diameter, and a lower bore 28 of smaller diameter (relative to each other), whereby an annular abutment or seat 29 is created.

The internally threaded nut 30 of FIG. 3 has a flange 32 whose outside diameter is approximately equal to the diameter of the upper bore 26 of retainer 10. Thus, when placed inside the retainer 10, the flange 32 of nut 30 rests on the seat 29, as will be seen in FIGS. 5 and 6.

The height of flange 32 is approximately equal to the distance from seat 29 to the top of the shank 18 and the bottom of the collar 24. Thus, collar 24 is adapted to be turned inwardly over and down on to the upper surface of flange 32, as illustrated in FIGS. 5 and 6.

In its normal position, that is, before being turned down, collar 24 is up-right and annular. In accordance with my present invention, pressure is applied to collar 24 at four locations, spaced 90° apart, to turn the collar inwardly over and down as shown in FIGS. 5 and 6. When thus turned over, collar 24 takes on a square configuration, as shown in FIG. 7. To receive the turned-over collar, the upper surface of flange 32 is given four flat shoulders or surfaces, 33, 34, 35 and 36, as shown in FIGS. 4 and 7. These may be conveniently generated by having the nut 30 originally equipped with a flange extending up to point X in FIG. 3 and then milling away the upper portions of the flange tangent to the outside diameter of the shank 37 of nut 30 at four locations, spaced 90° apart, thereby creating the four shoulders 33, 34, 35, 36 as seen in FIG. 4. When the collar 24 is turned over on to the four shoulders, as shown in FIG. 7, the nut 30 is locked in the retainer 10 against axial displacement. At the four corners, the unmilled portions 63, 64, 65 and 66, rise above the shoulders 33, 34, 35, 36, and these raised portions retain the nut 30 against radial displacement, except for a small amount of desirable play.

Referring again to FIG. 5, there is illustrated the assembly of the press insert retainer 10 and floating nut 30 about to be driven or pressed into the hole 14 of the metal sheet 16 by a setting punch 41 resting on the smooth upper annular surface of shank 18. Centered beneath hole 14 is an anvil or backing plate 42. As the insert retainer is driven into the hole, the knurling 20 engages and compresses the upper edge of the hole 14 and metal of the sheet 16 is displaced and flows into the recess 22.

In FIG. 6 is illustrated the situation after the insert retainer 10 has been fully driven into the hole 14, the extent of the drive-in being limited by the larger-diameter shank 18 of the retainer 10. In fully inserted position, the flange 12 is just shy of being flush with the lower surface of sheet 16.

In FIG. 6, ignoring the flat-headed bolt 44 later referred to, it will be seen that the displaced metal in recess 22 creates a retaining ring of metal that anchors the insert 10 securely in the sheet metal 16. The insert 10 has high resistance to downward push-out by virtue of the compressive action of the shank 18 against the upper surface of the sheet 16, and has high resistance to upward push-out by virtue of the compressive action of the flat floor of recess 22 against the ring of displaced metal in the groove.

I have found that increased high resistance to radial displacement (torque-out) is provided by using knurling (20) projected an an angle as hereinabove described.

As illustrative of one manner in which the floating press nut assembly (10, 30) may be used, a flat-headed bolt 44 is shown threaded upwardly into the nut 30 and holding a plate 45 against the metal sheet 16. Referring now to FIGS. 8 and 9, there is shown an internally threaded press nut 50 having annular knurling 52 angled at an angle Y in accordance with the present invention as previously described in connection with knurling 20 of FIG. 1. Immediately below the knurling 52, the press nut 50 has a recess 54 shaped and curved as shown in the drawing and as previously described in connection with recess 22 of FIG. 1. In FIG. 8, the shank 56 of the nut 50 has a smaller outside diameter than does the knurling 52. However, if desired, the outer diameter of shank 56 may be equal to or larger than that of knurling 52, and in the latter respect may be similar to shank 18 of retainer 10 of FIG. 1. The arrangement shown in FIG. 8 illustrates, however, that it is not essential that the shank be of larger diameter than the angled knurling, as will become clear from FIG. 10.

FIG. 10 shows the press nut 50 after it has been fully inserted into the hole in metal sheet 58. As an illustration of one use of the press nut, a flat-headed bolt 60 is down threaded upwardly into press nut 50 and holding a plate 62 against the metal sheet 58. It is to be understood, of course, that the press nut 50 may just as well be used to take a bolt threaded into it from the top, instead of from the bottom as happens to be illustrated in FIG. 10. (The same is true of the floating press nut 30 of FIG. 6.)

As will be seen from FIG. 10, the nut 50 has high resistance to downward axial displacement (downward push-out) by reason of the compressive action of the angled knurling 52 against the metal sheet 58, and has high resistance to upward push-out (ignoring the flat-headed bolt 60) by reason of the compressive action of the flat floor of recess 54 against this ring of displaced metal in the groove.

It will be understood that while more complex, the floating press nut assembly of FIGS. 1 through 7 has an advantage over the press nut of FIGS. 8–10 in that the floating nut in the retainer has a slight amount of play which relaxes the required tolerances. For example, it is not essential, in the case of a retainer (10) that the axis of the retainer, after insertion in the sheet of metal, be as close as possible to being absolutely normal to the plane of the metal sheet, as ordinarily is the case when a press nut (50) is used.

While the preferred embodiments of my invention have been described in some detail, it will be obvious to one skilled in the art that various modifications may be made without departing from the invention as hereinafter claimed.

The terms non-threaded press insert and non-threaded press insert retainer as used in the appended claims mean a press insert or press fastener of the type having no external threads adapted to be employed for retaining the insert or fastener in the holding material.

Having thus described my invention I claim:

1. A non-threaded press insert having: a lower external continuous and peripheral flange for insertion in a hole formed in a sheet of metal, an upper shank for receiving pressure applied in a downward axial direction thereby to secure said press insert in said metal sheet and a portion intermediate said flange and said shank having an external, continuous and peripheral knurled surface the upper outer diameter of which is larger than that of said lower flange, the lower inner diameter of said knurled surface being as small as the diameter of said lower flange the knurled surface projecting downwardly and inwardly at an angle of between 30° and 60° with respect to the axis of said insert, an external, continuous and peripheral recess just above said flange and just below said knurled surface for receiving the displaced metal of said sheet which is pressure flowed thereinto when said knurled surface is pressed into the upper edge of said hole.

2. A press insert as claimed in claim 1 characterized in that said recess has a flat floor and an inner wall curved upwardly towards said knurled surface.

3. A press insert having a lower annular external flange externally non-threaded for insertion in a sheet of metal having cold-flow properties in a hole having a diameter substantially equal to the outer diameter of said flange; an upper shank; an annular inclined external knurled surface below said shank and above said flange, said knurled surface being inclined downwardly and inwardly at an angle of between 30 degrees and 60 degrees relative to the axis of said insert, the large diameter of said knurled surface being larger than, and the small diameter of said knurled surface being at least as small as, the outer diameter of said flange; and an annular external recess just below said knurled surface and above said flange for receiving the displaced metal of said sheet which is pressure flowed thereinto when said knurled surface is pressed into the upper edge of said hole.

4. A press insert as claimed in claim 3 characterized in that the knurled surface inclines downwardly and inwardly at an angle of about 45° with respect to the axis of said insert.

5. A press insert having a lower annular external flange externally non-threaded for insertion in a sheet of metal having cold-flow properties in a hole having a diameter substantially equal to the outer diameter of said flange; an upper shank; an annular inclined external knurled surface below said shank and above said flange, said knurled surface being inclined downwardly and inwardly at an angle of between 30 degrees and 60 degrees relative to the axis of said insert, the large diameter of said knurled surface being larger than, and the small diameter of said knurled surface being at least as small as, the outer diameter of said flange; and an annular external recess just below said knurled surface and above said flange for receiving the displaced metal of said sheet which is pressure flowed thereinto when said knurled surface is pressed into the upper edge of said hole, said recess having a flat floor located below and inward from said knurled surface and having an inner wall which curves smoothly upwardly and outwardly in a semi-arch contour toward said knurled surface.

References Cited in the file of this patent

UNITED STATES PATENTS

| | | |
|---|---|---|
| Re. 19,628 | Dodge | July 2, 1935 |
| 1,120,403 | O'Leary | Dec. 8, 1914 |
| 1,929,824 | Polley | Oct. 10, 1933 |
| 1,946,064 | Creveling | Feb. 6, 1934 |
| 1,974,150 | Creveling | Sept. 18, 1934 |
| 2,195,598 | Olson | Apr. 2, 1940 |
| 2,361,979 | Tarwater et al. | Nov. 7, 1944 |
| 2,444,145 | Rosan | June 29, 1948 |
| 2,486,769 | Watson | Nov. 1, 1949 |
| 2,933,006 | Gibb | Apr. 19, 1960 |
| 2,997,530 | Rosan | Aug. 22, 1961 |

FOREIGN PATENTS

| | | |
|---|---|---|
| 1,062,244 | France | Dec. 2, 1953 |
| 937,133 | Germany | Dec. 29, 1955 |
| 757,560 | Great Britain | Sept. 19, 1956 |
| 1,178,030 | France | Dec. 8, 1958 |